United States Patent Office 3,642,891
Patented Feb. 15, 1972

3,642,891
META-ANILIDE UREA COMPOSITIONS AND
THEIR UTILITY AS HERBICIDES
Eugene G. Teach, El Cerrito, Calif., assignor to Stauffer
Chemical Company, New York, N.Y.
No Drawing. Continuation-in-part of application Ser. No.
746,007, July 19, 1968, which is a continuation-in-part
of application Ser. No. 662,573, Aug. 23, 1967. This
application Mar. 26, 1970, Ser. No. 23,021
Int. Cl. C07c 127/00
U.S. Cl. 260—553 A   25 Claims

ABSTRACT OF THE DISCLOSURE

Meta-anilide urea compositions have the formula:

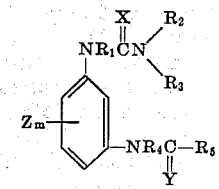

in which X and Y are, independently, oxygen and sulfur; $R_1$ is hydrogen or lower alkyl; $R_2$ and $R_3$ are, independently, hydrogen, alkyl, lower alkoxy, haloalkyl, lower alkenyl, cycloalkyl having from 3 to 6 carbon atoms, inclusive, carbalkoxyalkyl, furfuryl, naphthyl, phenyl or substituted-phenyl, inclusive, in which the substituents are halogen, nitro, or lower alkoxy; $R_4$ is hydrogen or lower alkyl; $R_5$ is hydrogen, alkyl, ethyl cycloalkyl, lower alkenyl, halogenated lower alkyl, cycloalkyl having 3 to 6 carbon atoms, inclusive, pinonoyl 2,4-dichlorophenoxymethylene, benzyl, phenyl, or substituted-phenyl in which the substituents are halogen, nitro, lower alkyl, lower alkoxy or trihalomethyl; Z is halogen, lower alkyl, nitro, amino or trifluoromethyl, and $m$ is an integer having a value from 0 to 4, inclusive, provided that when $R_1$, $R_2$, $R_3$ and $R_4$ are each hydrogen, X and Y are each oxygen and $m$ is 0, then $R_5$ is other than methyl or ethyl. The compounds are useful as herbicides and they exhibit both pre-emergence and post-emergence activity. Representative compounds are:

1-(3'-isobutyramidophenyl)-3-methyl urea,
1-cyclohexyl-3-(3'-propionamidophenyl)urea,
1-butyl-3-(3'-propionamidophenyl)urea,
1-butyl-3-(3'-isobutyramidophenyl)urea,
1-(3'-nitrophenyl)-3-(3'-isobutyramidophenyl)urea,
1-N,N-dimethyl-3-(pivalamidophenyl)urea,
1-(3'-propionamidophenyl)-3-n-butyl thiourea, and
1-(3'-pestafluoropropionamidophenyl)-3,3-dimethyl urea.

This application is a continuation-in-part of copending application Ser. No. 746,007, filed July 19, 1968, now abandoned, which in turn is a continuation-in-part application of Ser. No. 662,573, filed Aug. 23, 1967, now abandoned.

This invention relates to certain novel meta-anilide ureas which are useful as herbicides. More specifically, this invention relates to certain substituted organo-anilide ureas and to the preparation and utility of the compounds as herbicides.

The compounds of the present invention correspond to the formula:

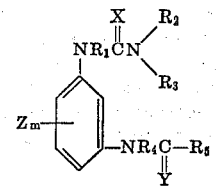

in which X and Y are independently selected from the group consisting of oxygen and sulfur, $R_1$ is hydrogen or lower alkyl, $R_2$ and $R_3$ are independently selected from the group consisting of hydrogen, alkyl, lower alkoxy, haloalkyl, lower alkenyl, cycloalkyl having from 3 to 6 carbon atoms, inclusive, carbalkoxyalkyl, furfuryl, naphthyl, phenyl, substituted-phenyl in which said substituents are selected from the group consisting of halogen, nitro, and lower alkoxy; $R_4$ is hydrogen or lower alkyl; $R_5$ is selected from the group hydrogen, alkyl, ethylcycloalkyl, lower alkenyl, halogenated lower alkyl, cycloalkyl having from 3 to 6 carbon atoms, inclusive, pinonoyl, 2,4-dichlorophenoxymethylene, benzyl, phenyl, substituted-phenyl in which said substituents are selected from the group consisting of halogen, nitro, lower alkyl, lower alkoxy and trihalomethyl; and Z is selected from the group consisting of halogen, lower alkyl, nitro, amino and trifluoromethyl, and $m$ is an integer having a value from 0 to 4, inclusive, preferably 0 to 2, inclusive, provided that when $R_1$, $R_2$, $R_3$ and $R_4$ are each hydrogen, X and Y are both oxygen and $m$ is 0, then $R_5$ is other than methyl or ethyl.

One embodiment of the invention includes compounds having the formula:

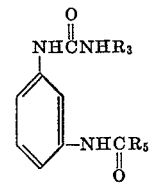

in which $R_3$ and $R_5$ are each alkyl having 1 to 10 carbon atoms.

As employed in this specification, the terms lower alkyl and lower alkoxy preferably include those members of the group containing from 1 to 6 carbon atoms, inclusive, in either a straight chain or a branched chain configuration. Similarly, the term alkyl preferably includes those members of the group containing 1 to 10 carbon atoms, inclusive. The term lower alkenyl preferably includes those members of the group containing at least one olefinic bond and containing from 2 to 4 carbon atoms, inclusive. The term carbalkoxyalkyl preferably includes those members of the group containing from 3 to 6 carbon atoms, inclusive. The term halogen, as employed herein and in the terms haloalkyl, halogen, halogenated, trihalomethyl, preferably includes fluorine, chlorine and bromine.

The compounds of the present invention are prepared by several methods. Two such methods applicable in preparing the compounds is the condensation between the appropriate meta-amino substituted anilide with either an isocyanate or carbamoyl chloride and also the condensation of the appropriate meta-amino urea and either an acyl halide or acid anhydride. These methods will be further exemplified below. Similarly, an isothiocyanate is employed to prepare the thiourea derivatives. When the unsubstituted amidophenyl urea is prepared a cyanate salt is reacted with the appropriate substituted amido aniline. The reactions proceed readily in the liquid phase. The employment of a solvent is also useful, facilitating processing, as well as agitation of the reactants. Solvents such as water, benzene, toluene, acetone, tetrahydrofuran, and the like, are employed. A catalyst may be employed to enhance the reaction although a catalyst is not required. Catalysts such as e.g. dibutyltin dilaurate and anhydrous potassium carbonate and copper powder, are effective catalysts. The reactions are carried out at temperatures that permit operation in the liquid phase. These temperatures are between about room temperature and reflux temperature of the solvent if a solvent is employed. Preferably, the reaction mixture is refluxed at an elevated temperature.

Compounds of the present invention are prepared in accordance with the following illustrative examples.

EXAMPLE 1

Preparation of 1-(3'-isobutyramidophenyl)-3-methyl urea

Meta-amino isobutyranilide, 12.5 g. (0.07 mole), is disvolved in 100 ml. of acetone containing a few drops of dibutyltin dilaurate. Methyl isocyanate, 4.4 g. (0.077 mole), is added to the mixture. The mixture is refluxed for two hours. On cooling, the crystalline product is filtered off and dried. There is obtained 8.2 g. (50 percent of theory) of the title compound, M.P. 168–171° C.

EXAMPLE 2

Preparation of 1-(3'-pivalamidophenyl)-3,3-dimethyl urea

Meta-amino pivalanilide 15.4 g. (0.08 mole) is dissolved in 100 ml. of acetone containing 11 g. of finely powdered anhydrous potassium carbonate and a trace of copper powder. Dimethylcarbamoyl chloride 8.6 g. (0.08 mole) is added and the mixture is refluxed for 8 hours with stirring. The solid is filtered off and the acetone is removed under vacuum. The viscous liquid product is triturated with ether and crystallizes. It is washed with water, and 5% hydrochloric acid solution and is dried. There is obtained 12.5 g. (60 percent of theory) of the title compound, M.P. 181–186° C.

EXAMPLE 3

Preparation of 1-(3'-propionamidophenyl)-3-n-butyl thiourea

Meta-propionamidoaniline, 8.2 g. (0.05 mole), is dissolved in 50 ml. of acetone. To this solution is added 5.8 g. of n-butylisothiocyanate. The resulting mixture is refluxed for two hours. After cooling, it is poured on to crushed ice and washed with water. After filtering, the product is dried in vacuum. There is obtained 13.8 g. (98.5 percent of theory) of the title compound, M.P. 136–138° C.

EXAMPLE 4

Preparation of 3'-propionamidophenyl urea

Meta-propionamidoaniline, 8.2 g. (9.05 moles) is dissolved in 100 ml. of dilute hydrochloric acid solution. Potassium cyanate, 4.1 g. is dissolved in 20 ml. of water and this is added to the above acid solution. The resulting mixture is maintained at 30–40° C. for three hours. After cooling, the crystals are filtered and washed with water. They are dried further in vacuum. There is obtained 8.9 g. (86 percent of theory) of the title compound, M.P. 188–190° C.

EXAMPLE 5

Preparation of 1-(3'-butyramidophenyl)-3-methyl urea

N-meta-aminophenyl-N'-methyl urea, 11.5 g. (0.07 mole) is suspended in 100 ml. of ether and 11.1 g. of n-butyric anhydride containing 5 drops of concentrated sulfuric acid is added dropwise. The mixture is heated at reflux for 1 hour. The mixture is cooled and the product filtered off. The product is washed successively with dilute (5%) sodium hydroxide, dilute (5%) HCl, and water and then dried. There is obtained 11.2 g. (68 percent of theory) of the title compound, M.P. 158–159° C.

EXAMPLE 6

Preparation of 1-(3'-cyclohexanecarboxamidophenyl)-3-methyl urea

N-meta-aminophenyl - N' - methyl urea 11.5 g. (0.07 mole) dissolved in acetone containing 7.7 g. (0.076 mole) of triethylamine and 11.3 g. of cyclohexane carbonyl chloride is added dropwise with stirring. The product precipitates from the acetone and is filtered off, washed with water and then dried. There is obtained 16.0 g. (83 percent of theory) of the title compound, M.P. 190–193° C.

The following is a table of the compounds which are prepared according to the aforementioned procedures. Compound numbers have been assigned to them and are used for identification throughout the balance of the specification.

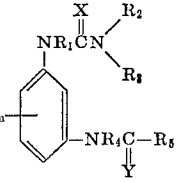

TABLE I

| Compound Number | X | Y | $R_1$ | $R_2$ | $R_3$ | $R_4$ | $R_5$ | Z | M.P., ° C. |
|---|---|---|---|---|---|---|---|---|---|
| 1 | O | O | H | H | $CH_3$ | H | $C_2H_5$ | | 175–179 |
| 2 | O | O | H | $CH_3$ | $CH_3$ | H | $C_2H_5$ | | 279.5–282 |
| 3 | O | O | H | H | 3-Cl-phenyl | H | $C_2H_5$ | | 209–211 |
| 4 | O | O | H | H | $CH_3$ | H | i-$C_3H_7$ | | 167–171 |
| 5 | O | O | H | H | $C_2H_5$ | H | i-$C_3H_7$ | | 169–173 |
| 6 | O | O | H | H | n-$C_3H_7$ | H | i-$C_3H_7$ | | 169–170.5 |
| 7 | O | O | H | H | i-$C_3H_7$ | H | i-$C_3H_7$ | | 168–170 |
| 8 | O | O | H | H | $C_2H_5$ | H | $C_2H_5$ | | 176–177.5 |
| 9 | O | O | H | H | i-$C_3H_7$ | H | $C_2H_5$ | | 184–185 |
| 10 | O | O | H | H | n-$C_3H_7$ | H | $C_2H_5$ | | 165–168 |
| 11 | O | O | H | H | Cyclohexyl | H | $C_2H_5$ | | 178–179 |
| 12 | O | O | H | H | Phenyl | H | $C_2H_5$ | | 211–212 |
| 13 | O | O | H | H | 3-$NO_2$-phenyl | H | $C_2H_5$ | | 207–209 |
| 14 | O | O | H | H | n-$C_4H_9$ | H | $C_2H_5$ | | 151–154 |
| 15 | O | O | H | H | 3,4-diCl-phenyl | H | $C_2H_5$ | | 167–170 |
| 16 | O | O | H | H | $CH_2COOC_2H_5$ | H | $C_2H_5$ | | 150–152 |
| 17 | O | O | H | H | $CH_2CH=CH_2$ | H | $C_2H_5$ | | 157–160 |
| 18 | O | O | H | H | $C_8H_{17}$ | H | $C_2H_5$ | | 151–154 |
| 19 | O | O | H | H | 4-$OCH_3$-phenyl | H | $C_2H_5$ | | 210–211 |
| 20 | O | O | H | H | 4-$NO_2$-phenyl | H | $C_2H_5$ | | 215–219 |
| 21 | O | O | H | H | Naphthyl | H | $C_2H_5$ | | 278–282 |
| 22 | O | O | H | H | $CH_2CH=CH_2$ | H | i-$C_3H_7$ | | 175–176 |
| 23 | O | O | H | H | n-$C_4H_9$ | H | i-$C_3H_7$ | | 157–158.5 |
| 24 | O | O | H | H | Cyclohexyl | H | i-$C_3H_7$ | | 213–217 |

TABLE I—Continued

| Compound Number | X | Y | R₁ | R₂ | R₃ | R₄ | R₅ | Z | M.P., °C |
|---|---|---|---|---|---|---|---|---|---|
| 25 | O | O | H | H | C₈H₁₇ | H | i-C₃H₇ | | 134–136 |
| 26 | O | O | H | H | Phenyl | H | i-C₃H₇ | | 221–223 |
| 27 | O | O | H | H | 3-Cl-phenyl | H | i-C₃H₇ | | 214–216 |
| 28 | O | O | H | H | 3,4-diCl-phenyl | H | i-C₃H₇ | | 218–221 |
| 29 | O | O | H | H | 3-NO₂-phenyl | H | i-C₃H₇ | | 201–203 |
| 30 | O | O | H | H | CH₃ | H | t-C₄H₉ | | 164–166 |
| 31 | O | O | H | H | i-C₃H₇ | H | t-C₄H₉ | | 179–181 |
| 32 | O | O | H | H | 3-Cl-phenyl | H | t-C₄H₉ | | 218–221 |
| 33 | O | O | H | CH₃ | CH₃ | H | t-C₄H₉ | | 181–186 |
| 34 | S | O | H | H | n-C₄H₉ | H | C₂H₅ | | 136–138 |
| 35 | S | O | H | H | CH₃ | H | C₂H₅ | | 189–190 |
| 36 | O | O | H | H | CH₃ | H | CH₂C(CH₃)₃ | | 181–183 |
| 37 | O | O | H | H | 3-NO₂-phenyl | H | CH₂C(CH₃)₃ | | 174–177 |
| 38 | O | O | H | CH₃ | CH₃ | H | CCl₃ | | 169–173 |
| 39 | O | O | H | CH₃ | CH₃ | H | CF₃ | | 178–184 |
| 40 | O | O | H | CH₃ | CH₃ | H | n-C₃H₇ | | 133–136 |
| 41 | O | O | H | CH₃ | CH₃ | H | CH₂O-2,4-diCl-phenyl | | 146–148 |
| 42 | O | O | H | H | C₂H₅ | H | C(CH₃)₃ | | 56–61 |
| 43 | O | O | H | H | n-C₃H₇ | H | C(CH₃)₃ | | $n_D^{30}$=1.5158 |
| 44 | O | O | H | H | CH₂CH=CH₂ | H | C(CH₃)₃ | | $n_D^{30}$=1.5293 |
| 45 | O | O | H | H | n-C₄H₉ | H | C(CH₃)₃ | | $n_D^{30}$=1.5150 |
| 46 | O | O | H | H | C(CH₃)₃ | H | C(CH₃)₃ | | 185.5–188 |
| 47 | O | O | H | H | Cyclohexyl | H | C(CH₃)₃ | | 145–150 |
| 48 | O | O | H | H | CH₃ | H | CH(CH₃)C₃H₇ | | 132–137 |
| 49 | O | O | H | H | C₂H₅ | H | CH(CH₃)C₃H₇ | | 118–122 |
| 50 | O | O | H | H | n-C₃H₇ | H | CH(CH₃)C₃H₇ | | $n_D^{30}$=1.5262 |
| 51 | O | O | H | H | i-C₃H₇ | H | CH(CH₃)C₃H₇ | | $n_D^{30}$=1.5078 |
| 52 | O | O | H | H | CH₂CH=CH₂ | H | CH(CH₃)C₃H₇ | | 118–123 |
| 53 | O | O | H | H | n-C₄H₉ | H | CH(CH₃)C₃H₇ | | $n_D^{30}$=1.5318 |
| 54 | O | O | H | H | C(CH₃)₃ | H | CH(CH₃)C₃H₇ | | 177–181 |
| 55 | O | O | H | H | CH₃ | H | C(CH₃)₂C₂H₇ | | 146–148 |
| 56 | O | O | H | H | C₂H₅ | H | C(CH₃)₂C₂H₇ | | $n_D^{30}$=1.5258 |
| 57 | O | O | H | H | n-C₃H₇ | H | C(CH₃)₂C₂H₇ | | $n_D^{30}$=1.5242 |
| 58 | O | O | H | H | i-C₃H₇ | H | C(CH₃)₂C₂H₇ | | $n_D^{30}$=1.5202 |
| 59 | O | O | H | H | CH₂CH=CH₂ | H | C(CH₃)₂C₂H₇ | | $n_D^{30}$=1.5455 |
| 60 | O | O | H | H | n-C₄H₉ | H | C(CH₃)₂C₂H₇ | | $n_D^{30}$=1.5075 |
| 61 | O | O | H | H | Cyclohexyl | H | C(CH₃)₂C₂H₇ | | $n_D^{30}$=1.5409 |
| 62 | O | O | H | H | CH₂CH(Br)CH₂(Br) | H | C(CH₃)₂C₂H₇ | | 65–70 |
| 63 | O | O | H | H | CH₃ | H | CH₂Cl | | 183–188 |
| 64 | O | O | H | H | CH₃ | H | CCl₃ | | 142–148 |
| 65 | O | O | H | H | CH₃ | H | CF₃ | | 141–147 |
| 66 | O | O | H | H | CH₃ | H | CH(C₂H₅)₂ | | 148–153 |
| 67 | O | O | H | H | CH₃ | H | Phenyl | | 201–203 |
| 68 | O | O | H | H | CH₃ | H | CH(CH₃)C₂H₅ | | 153–159 |
| 69 | O | O | H | H | i-C₃H₇ | H | CH(CH₃)C₂H₅ | | 190–192.5 |
| 70 | O | O | H | H | C(CH₃)₃ | H | CH(CH₃)C₂H₅ | | 167–172 |
| 71 | O | O | H | H | CH₃ | H | CH(CH₃)C₂H₅ | 6-Cl | 179–183 |
| 72 | O | O | H | H | i-C₃H₇ | H | i-C₃H₇ | 6-Cl | 126–128 |
| 73 | O | O | C₂H₅ | H | CH₃ | H | C₂H₅ | | 200.5–204.5 |
| 74 | S | O | H | CH₃ | CH₃ | H | C(CH₃)₂C₂H₇ | | 66–70 |
| 75 | O | O | H | H | CH₃ | H | CH₂CH₂C(CH₃)₃ | | 193.5–195 |
| 76 | O | O | H | H | i-C₃H₇ | H | CH₂CH₂C(CH₃)₃ | | 185–190 |
| 77 | O | O | H | H | CH₃ | H | n-C₃H₇ | | 158–159 |
| 78 | O | O | H | H | CH₃ | H | n-C₄H₉ | | 159.5–161 |
| 79 | O | O | H | H | CH₃ | H | n-C₅H₁₁ | | 162–163.5 |
| 80 | O | O | H | H | CH₃ | H | CH₂CH(CH₃)₂ | | 144–145.5 |
| 81 | O | O | H | H | CH₃ | H | CH₂CH₂CH(CH₃)₂ | | 166–167.5 |
| 82 | O | O | H | H | CH₃ | H | CH=CH₂ | | 160–165 |
| 83 | O | O | H | H | CH₃ | H | CH=C(CH₃)₂ | | $n_D^{30}$=1.5453 |
| 84 | O | O | H | H | CH₃ | H | Cyclopropyl | | 197–201 |
| 85 | O | O | H | H | CH₃ | H | Cyclohexyl | | 190–193 |
| 86 | O | O | H | H | CH₃ | H | CH₂O-2,4-diCl-phenyl | | 226–231 |
| 87 | O | O | H | H | H | H | C(CH₃)₂C₂H₇ | | 142–147 |
| 88 | O | O | H | H | C₂H₅ | H | CH₂C(CH₃)₃ | | 166–169 |
| 89 | O | O | H | H | n-C₄H₈ | H | H | | 106–112 |
| 90 | O | O | H | H | n-C₄H₉ | H | CH₃ | | 138–141 |
| 91 | O | O | H | H | n-C₄H₉ | H | n-C₃H₇ | | 139–142 |
| 92 | O | O | H | H | n-C₄H₉ | H | CH=C(CH₃)₂ | | 68–73 |
| 93 | O | O | H | H | n-C₄H₉ | H | CH₂CH(CH₃)₂ | | 113–116 |
| 94 | O | O | H | H | n-C₄H₉ | H | CH₂C(CH₃)₃ | | 73–78 |
| 95 | O | O | H | H | n-C₄H₉ | H | CCl₃ | | 113–115 |
| 96 | O | O | H | C₂H₅ | C₂H₅ | H | C(CH₃)C₃H₇ | | 1.5648 |

| Compound Number | X | Y | R₁ | R₂ | R₃ | R₄ | R₅ | Z | $n_D^{30}$ melting point, °C |
|---|---|---|---|---|---|---|---|---|---|
| 97 | O | O | H | C₂H₅ | C₂H₅ | H | C₂H₅ | | 1.5425 |
| 98 | O | O | H | C₂H₅ | H | H | CF₃ | | 207–211 |
| 99 | O | O | H | C₂H₅ | H | H | CH₂CH=CH₂ | | 174–181 |
| 100 | O | O | H | H | C₂H₅ | H | C(CH₃)₂CH₂Cl | | 68–72 |
| 101 | O | O | H | H | C₂H₅ | H | CHCH₃C₂H₅ | | 122–126 |
| 102 | O | O | H | H | C₂H₅ | H | CH₂CH(CH₃)₂ | | 167–168.5 |
| 103 | O | O | H | H | C₂H₅ | H | CH(C₂H₅)₂ | | 133.5–137.5 |
| 104 | O | O | H | H | C₂H₅ | H | CH₂CH₂-cyclopentyl | | 197–200 |
| 105 | O | O | H | H | C₂H₅ | H | C(CH₃)[CH(CH₃)₂]CH(CH₃)CH₃ | | 63–69 |
| 106 | O | O | H | H | C₂H₅ | H | CH₂CH₂-cyclohexyl | | 189–191 |
| 107 | O | O | H | H | C₂H₅ | H | CH₂CH(CH₃)CH₂C(CH₃)₃ | | 71–75 |
| 108 | O | O | H | H | C₂H₅ | H | Pinonyl | | 164–167 |
| 109 | O | O | H | H | 3,4-diCl-phenyl | H | C(CH₃)₃ | | 219–220 |
| 110 | O | O | H | CH₃ | CH₃ | H | C₂F₅ | | 150.5–157 |
| 111 | O | O | H | H | C(CH₃)₃ | H | C₂H₅ | | 116–121 |
| 112 | O | O | H | H | CH₃ | H | C(C₂H₅)₂CH₃ | | 174–175 |
| 113 | O | O | H | H | CH₃ | H | CH₂CH(CH₃)C₂H₅ | | 139–142 |
| 114 | O | O | H | H | CH₃ | H | CCl₃ | | 135–138 |
| 115 | O | O | H | H | CH₃ | H | C₂F₅ | | 177–180 |
| 116 | O | O | H | H | CH₃ | H | CCl=CCl₂ | | 195–196 |
| 117 | O | O | H | H | CH₃ | H | CBr(CH₃)₂ | | 121 |
| 118 | O | O | H | H | CH₃ | H | C(CH₃)₂CH₂Cl | | 131–136 |
| 119 | O | O | H | H | CH₃ | H | CH₂CH(CH₃)C₂H₅ | | 138–140 |
| 120 | O | O | H | H | CH₃ | H | CH₂C(CH₃)₂C₂H₅ | | 163–166 |
| 121 | O | O | H | H | CH₃ | H | CH(C₂H₅)C₄H₉ | | 162–164 |
| 122 | O | O | H | H | CH₃ | H | CH₂CH(CH₃)CH₂C(CH₃)₃ | | 132–135 |
| 123 | O | O | H | CH₃ | CH₃ | H | CCl₂CH₃ | | 155–159 |
| 124 | O | O | H | H | C₂H₅ | H | CH₂CH(CH₃)C₂H₅ | | 136–138 |
| 125 | O | O | H | H | C₂H₅ | H | CH₂C(CH₃)₂C₂H₅ | | 137–140 |
| 126 | O | O | H | H | CH₃ | H | CH(C₂H₅)C₄H₉ | | 160–162 |
| 127 | O | O | H | H | C₂H₅ | H | CH(C₂H₅)C₄H₉ | | 165–167 |
| 128 | O | O | H | H | CH₃ | H | CCl₂CF₃ | | 151–154 |

TABLE I—Continued

| Compound Number | X | Y | R₁ | R₂ | R₃ | R₄ | R₅ | Z | $n_D^{30}$ melting point, °C |
|---|---|---|---|---|---|---|---|---|---|
| 129 | O | O | H | CH₃ | CH₃ | H | CCl₂CF₃ | | 105–110 |
| 130 | O | O | H | H | C₂H₅ | H | C₂F₅ | | 194–196 |
| 131 | O | O | H | H | CH₃ | H | 2-CH₃-phenyl | | 159–160 |
| 132 | O | O | H | H | CH₃ | H | 3-CH₃-phenyl | | 195–197 |
| 133 | O | O | H | H | CH₃ | H | 4CH₃-Phenyl | | 219–221 |
| 134 | O | O | H | H | CH₃ | H | 2Cl-Phenyl | | 155–159 |
| 135 | O | O | H | H | CH₃ | H | 3-Cl-phenyl | | 301–305 |
| 136 | O | O | H | H | CH₃ | H | 4-Cl-phenyl | | 314–317 |
| 137 | O | O | H | H | CH₃ | H | 2,4-diCl-phenyl | | 216–219 |
| 138 | O | O | H | H | CH₃ | H | 3,4-di cl-phenyl | | 203–205 |
| 139 | O | O | H | CH₃ | CH₃ | H | 2-CH₃-phenyl | | 129–132 |
| 140 | O | O | H | CH₃ | CH₃ | H | 3-CH₃-phenyl | | 144–147 |
| 141 | O | O | H | CH₃ | CH₃ | H | 4-CH₃-phenyl | | 173–175 |
| 142 | O | O | H | CH₃ | CH₃ | H | 2-Cl-phenyl | | 101–105 |
| 143 | O | O | H | CH₃ | CH₃ | H | 3-Cl-phenyl | | 175–178 |
| 144 | O | O | H | CH₃ | CH₃ | H | 4-Cl-phenyl | | 1.195 |
| 145 | O | O | H | CH₃ | CH₃ | H | 2,4-di-Cl-phenyl | | 102–107 |
| 146 | O | O | H | CH₃ | CH₃ | H | 3,4-di-Cl-phenyl | | 96–99 |
| 147 | O | O | H | CH₃ | CH₃ | (²) | C₂F₅ | | 99–105 |
| 148 | O | O | H | CH₃ | n-C₄H₉ | H | CF₃ | | Glass |
| 149 | O | O | H | CH₃ | n-C₄H₉ | H | C₂F₅ | | 105–108 |
| 150 | O | O | H | CH₃ | n-C₄H₉ | H | C₂H₅ | | Glass |
| 151 | O | O | H | CH₃ | n-C₄H₉ | H | t-C₄H₉ | | Glass |
| 152 | O | O | H | CH₃ | n-C₄H₉ | H | C(CH₃)₃CH₂Cl | | Glass |
| 153 | O | O | H | CH₃ | n-C₄H₉ | H | CH(CH₃)C₂H₅ | | Glass |
| 154 | O | O | H | CH₃ | n-C₄H₉ | H | CH(C₂H₅)₂ | | Glass |
| 155 | O | O | H | CH₃ | n-C₄H₉ | H | CH(CH₃)C₃H₇ | | Glass |
| 156 | O | O | H | CH₃ | n-C₄H₉ | H | t-CH₂C₄H₉ | | Glass |
| 157 | O | O | H | CH₃ | n-C₄H₉ | H | Phenyl | | 65–68 |
| 158 | O | O | H | CH₃ | n-C₄H₉ | H | 3-Cl-phenyl | | 62–64 |
| 159 | O | O | H | CH₃ | n-C₄H₉ | H | 2,4-di-Cl-phenyl | | 1.5460 |
| 160 | O | O | H | OCH₃ | CH₃ | H | CCl₃ | | 148–150 |
| 161 | O | O | H | OCH₃ | CH₃ | H | CF₃ | | 140 |
| 162 | O | O | H | OCH₃ | CH₃ | H | C₂F₅ | | 118–119 |
| 163 | O | O | H | OCH₃ | CH₃ | H | C₂H₅ | | 107–110 |
| 164 | O | O | H | OCH₃ | CH₃ | H | t-C₄H₉ | | 1.5463 |
| 165 | O | O | H | OCH₃ | CH₃ | H | CH(CH₃)C₃H₇ | | 1.5463 |
| 166 | O | O | H | OCH₃ | CH₃ | H | C(CH₃)₂C₃H₇ | | 1.5410 |
| 167 | O | O | H | OCH₃ | CH₃ | H | 3-CH₃-phenyl | | 1.5802 |
| 168 | O | O | H | OCH₃ | CH₃ | H | 3-Cl-phenyl | | 1.5943 |
| 169 | O | O | H | OCH₃ | CH₃ | H | 2,4-di-Cl-phenyl | | 1.5823 |
| 170 | O | O | H | OCH₃ | CH₃ | H | 2,4-di-Cl-phenyl-OCH₂ | | 139–143 |
| 171 | O | O | H | CH₃ | Furfuryl | H | CCl₃ | | 1.5908 |
| 172 | O | O | H | CH₃ | do | H | C₂F₅ | | 114–116 |
| 173 | O | O | H | CH₃ | do | H | C₂H₅ | | Glass |
| 174 | O | O | H | CH₃ | do | H | CH(CH₃)₂ | | 1.5457 |
| 175 | O | O | H | CH₃ | do | H | t-C₄H₉ | | 1.5613 |
| 176 | O | O | H | CH₃ | do | H | CH(CH₃)C₃H₇ | | 1.5548 |
| 177 | O | O | H | CH₃ | do | H | CH(C₂H₅)₂ | | 129–131 |
| 178 | O | O | H | CH₃ | do | H | C(CH₃)₂C₃H₇ | | 1.5570 |

¹ When heated rapidly.
² Sodium salt.

Other examples of compounds falling within the generic formulas presented herein, which are preparable by the aforedescribed procedures and which may be formulated into herbicidal compositions and applied as herein illustrated are:

| X | Y | R₁ | R₂ | R₃ | R₄ | R₅ | Z |
|---|---|---|---|---|---|---|---|
| O | S | C₂H₅ | C₂H₅ | C₂H₅ | CH₃ | C₂H₅ | |
| S | O | C₂H₅ | C₂H₅ | C₂H₅ | CH₃ | C₂H₅ | |
| O | O | H | CH₃ | CH₃ | H | CH₃ | 5'-Cl |
| S | O | H | CH₃ | CH₃ | CH₃ | C₂H₅ | 5'-Br |
| O | S | H | H | CH₃ | CH₃ | CH₂CH=CH₂ | 5'-NO₂ |
| S | O | H | H | i-C₃H₇ | C₂H₅ | Cyclohexyl | 5'-CF₃ |
| S | O | n-C₄H₉ | H | CH₃ | H | Cyclopropyl | 5'-NH₂ |
| S | O | H | H | C₂H₅ | H | Phenyl | 5'-CH₃ |
| S | O | H | Cyclopropane | C₂H₅ | H | 3-Cl-phenyl | 5'-NO₂ |
| O | O | C₂H₅ | H | i-C₃H₇ | H | 3,4-diCl-phenyl | 5'-NO₂ |
| O | O | H | Phenyl | C₂H₅ | CH₃ | 4-NO₂-phenyl | 5'-NH₂ |
| S | O | H | CH₂CH=CH₂ | H | H | 4-OCH₃-phenyl | 5'-CH₃ |
| S | O | H | C₂H₅ | H | H | 4-CCl₃-phenyl | 5'-Br₂ |
| S | O | H | 3-Cl-phenyl | H | H | 4-CF₃-phenyl | 5'-CF₃ |
| O | O | H | H | n-C₃H₇ | H | CCl₃ | 5'-NH₂ |
| S | O | H | H | n-C₄H₉ | H | C(CH₃)₂Br | |
| S | S | CH₃ | CH₃ | CH₃ | H | CH₂CH₂Cl | 5'-NO₂ |
| O | O | H | H | CH₃ | H | CF₃ | 5'-CH₃ |
| O | O | H | H | CH₃ | H | Benzyl | |

Herbicidal screening tests

As previously mentioned, the novel compounds herein described are phytotoxic compounds which are useful and valuable in controlling various plants species. Compounds of this invention are tested as herbicides in the following manner.

*Pre-emergence herbicide test.*—On the day preceding treatment, seeds of seven different weed species are planted in individual rows using one species per row across the width of the flat. The seeds used are hairy crabgrass (*Digitaria sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20® (polyoxyethylene sorbitan monolaurate). The following day each flat is sprayed at the rate of 20 pounds of the candidate compound per 80 gallons of solution per acre. An atomizer is used to spray the solution on soil surface. The flats are placed in a greenhouse at 80° F. and watered regularly. Two weeks later, the degree of weed control is determined by comparing the amount of germination and growth of each weed in the treated flats with weeds in several untreated control flats. The rating system is as follows:

— =no significant injury (0–15 percent control)
+ =slight injury (25–35 percent control)
++ =moderate injury (55–65 percent control)
+++ =severe injury or death (85–100 percent control)

An acitivity index is used to represent the total activity on all seven weed species. It is the sum of the number of plus marks, so that an activity index of 21 represents complete control of all seven weeds. The results of this test are reported in Table II.

*Post-emergence herbicide test.*—Seeds of five weed species including hairy crabgrass, watergrass, wild oats, Indian mustard, and curly dock and one crop pinto beans (*Phaseolus vulgaris*), are planted in flats as described above for pre-emergence screening. The flats are placed in the greenhouse at 72–85° F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1 percent Tween 20® (polyoxy-ethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury levels are made and recorded 14 days after treatment. The rating system is the same as described above for the pre-emergence test where (−), (+), (++), and (+++) are used for the different levels for injury and control. The injury symptoms are also recorded. The maximum activity index for complete control of all the species in the post-emergence screening test is 18 which represents the sum of the plus marks obtained with the six plant species used in the test. The herbicide activity indices are shown in Table II.

TABLE II.—HERBICIDAL ACTIVITY,[1] SCREENING RESULTS

| Compound Number | Pre-emergence | Post-emergence |
| --- | --- | --- |
| 1 | 18 | 18 |
| 2 | 2 | 0 |
| 3 | 9 | 11 |
| 4 | 21 | 18 |
| 5 | 16 | 18 |
| 6 | 20 | 18 |
| 7 | 20 | 18 |
| 8 | 13 | 15 |
| 9 | 17 | 17 |
| 10 | 19 | 16 |
| 11 | 21 | 18 |
| 12 | 11 | 17 |
| 13 | 0 | 8 |
| 14 | 21 | 18 |
| 15 | 8 | 13 |
| 16 | 6 | 14 |
| 17 | 16 | 16 |
| 18 | 0 | 10 |
| 19 | 12 | 13 |
| 20 | 0 | 12 |
| 21 | 3 | 0 |
| 22 | 18 | 18 |
| 23 | 20 | 18 |
| 24 | 0 | 13 |
| 26 | 4 | 7 |
| 27 | 0 | 9 |
| 28 | 6 | 8 |
| 29 | 5 | 12 |
| 30 | 19 | 18 |
| 31 | 19 | 18 |
| 32 | 0 | 8 |
| 33 | 21 | 18 |
| 34 | 9 | 18 |
| 35 | 0 | 11 |
| 36 | 21 | 18 |
| 37 | 1 | 10 |
| 38 | 20 | 18 |
| 39 | 20 | 18 |
| 40 | 19 | 17 |
| 41 | 17 | 16 |
| 42 | 20 | 18 |
| 43 | 20 | 18 |
| 44 | 20 | 17 |
| 45 | 20 | 18 |
| 46 | 18 | 18 |
| 47 | 13 | 18 |
| 48 | 20 | 18 |
| 49 | 19 | 16 |
| 50 | 21 | 16 |
| 51 | 20 | 18 |
| 52 | 21 | 17 |
| 53 | 9 | 16 |
| 54 | 12 | 18 |
| 55 | 20 | 18 |
| 56 | 20 | 17 |
| 57 | 19 | 17 |
| 58 | 19 | 18 |
| 59 | 19 | 18 |
| 60 | 15 | 18 |
| 61 | 9 | 13 |
| 62 | 5 | 12 |
| 63 | 0 | 4 |
| 64 | 17 | 18 |
| 65 | 21 | 18 |
| 66 | 21 | 1 |
| 67 | 8 | 11 |
| 68 | 21 | 18 |
| 69 | 21 | 18 |
| 70 | 18 | 18 |
| 71 | 6 | 13 |
| 72 | 10 | 17 |
| 73 | 5 | 4 |
| 74 | 10 | 15 |
| 75 | 17 | 18 |
| 76 | 4 | 16 |
| 77 | 15 | 18 |
| 78 | 9 | 18 |
| 79 | 5 | 14 |
| 80 | 18 | 18 |
| 81 | 19 | 18 |
| 82 | 1 | 11 |
| 83 | 19 | 18 |
| 84 | 14 | 18 |
| 85 | 11 | 18 |
| 86 | 4 | 11 |
| 87 | 2 | 11 |
| 88 | 21 | 18 |
| 89 | 0 | 9 |
| 90 | 1 | 11 |
| 91 | 7 | 14 |
| 92 | 20 | 17 |
| 93 | 21 | 18 |
| 94 | 21 | 18 |
| 95 | 17 | 14 |
| 96 | 11 | 16 |
| 97 | 14 | 18 |
| 98 | 21 | 18 |
| 99 | 15 | 17 |
| 100 | 20 | 18 |
| 101 | 21 | 18 |
| 102 | 17 | 18 |
| 103 | 21 | 18 |
| 104 | 0 | 5 |
| 105 | 10 | 17 |
| 106 | 0 | 5 |
| 107 | 7 | 18 |
| 108 | 0 | 5 |
| 109 | 0 | 10 |
| 110 | 20 | 18 |
| 111 | 17 | 18 |
| 112 | 19 | 18 |
| 113 | 20 | 18 |
| 114 | 20 | 18 |
| 115 | 21 | 18 |
| 116 | 0 | 6 |
| 117 | 21 | 18 |
| 118 | 21 | 18 |
| 119 | 21 | 18 |
| 120 | 19 | 18 |
| 121 | 19 | 18 |
| 122 | 15 | 17 |
| 123 | 21 | 18 |
| 124 | 19 | 18 |
| 125 | 16 | 18 |
| 126 | 16 | 18 |
| 127 | 12 | 16 |
| 128 | 19 | 18 |
| 129 | 18 | 18 |
| 130 | 19 | 18 |
| 131 | 18 | 16 |
| 132 | 12 | 14 |
| 133 | 12 | 14 |
| 134 | 11 | 16 |
| 135 | 14 | 12 |
| 136 | 11 | 13 |
| 137 | 10 | 12 |
| 138 | 3 | 10 |
| 139 | 15 | 18 |
| 140 | 15 | 18 |
| 141 | 15 | 16 |
| 142 | 17 | 18 |
| 143 | 19 | 18 |
| 144 | 17 | 14 |
| 145 | 18 | 18 |
| 146 | 5 | 11 |
| 147 | 21 | 18 |
| 148 | 21 | 18 |
| 149 | 21 | 18 |

TABLE II.—HERBICIDAL ACTIVITY,[1] SCREENING RESULTS—Continued

| Compound Number | Pre-emergence | Post-emergence |
| --- | --- | --- |
| 150 | 21 | 18 |
| 151 | 21 | 18 |
| 152 | 21 | 18 |
| 153 | 21 | 18 |
| 154 | 21 | 18 |
| 155 | 21 | 18 |
| 156 | 21 | 18 |
| 157 | 15 | 17 |
| 158 | 17 | 17 |
| 159 | 19 | 17 |
| 160 | 21 | 18 |
| 161 | 21 | 18 |
| 162 | 21 | 18 |
| 163 | 20 | 18 |
| 164 | 21 | 18 |
| 165 | 21 | 18 |
| 166 | 21 | 18 |
| 167 | 18 | 18 |
| 168 | 18 | 18 |
| 169 | 18 | 18 |
| 170 | 17 | 16 |
| 171 | 17 | 16 |
| 172 | 17 | 18 |
| 173 | 13 | 17 |
| 174 | 15 | 18 |
| 175 | 16 | 18 |
| 176 | 17 | 18 |
| 177 | 17 | 18 |
| 178 | 11 | 18 |

[1] 21=85–100% control of all seven plant species tested preemergence. 18=85–100% control of all six plant species tested post-emergence.

The new compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsfying agents. The amount applied depends upon the nature of the seeds or plants to be controlled and the rate of application varies from approximately 1 to approximately 50 pounds per acre. One particularly advantageous way of applying the compound is a narrow band along a row crop straddling the row. In practice, the compounds are formulated with an inert carrier utilizing methods well known to those skilled in the art, thereby making them suitable for particular application.

The phytotoxic compositions of this invention are applied to the plants in the conventional manner. Thus, the solid and liquid compositions can be applied to the plant by the use of, for example, power-dusters, boom and hand sprayers and spraydusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface if the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis (3-methoxypropylamino)-6-methylthio - S - triazine; 2-chloro - 4 - ethylamino - 6 - isopropylamino - S - triazine, and 2-ethylamino - 4 - isopropylamino-6-methylcercapto-S-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl) hexamethylene imine, and N,N-diethyl-a-bromoacetamide, and the like; benzoic acids such as 3-amino-2,5-dichlorobenzoic and; thiocarbamates, such as S-propyl dipropylthiocarbamate; S-ethyl-dipropylthiocarbamate, S-ethyl-cyclohexyl - ethyl - thiocarbamate, S-ethyl hexahydro-1H-azepine-1-carbothioate and the like. Fertilizers useful in combination with the active ingredients include for example, ammonium nitrate, urea and superphosphates. Other useful additaments include materials in which plant organisms take root and grow such as compost, manure, humus, sand and the like.

The concentration of a compound of the present invention, constituting an effective amount in the best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

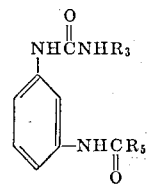

in which $R_3$ and $R_5$ are each alkyl having 1 to 10 carbon atoms.

2. A compound according to claim 1 in which $R_3$ is isopropyl and $R_5$ is tert-butyl.

3. A compound according to claim 1 in which $R_3$ is methyl and $R_5$ is isopropyl.

4. A compound according to claim 1 in which $R_3$ is n-butyl and $R_5$ is ethyl.

5. A compound according to claim 1 in which $R_3$ is n-butyl and $R_5$ is isopropyl.

6. A compound according to claim 1 in which $R_3$ is ethyl and $R_5$ is tert-butyl.

7. A compound according to claim 1 in which $R_3$ is n-propyl and $R_5$ is tert-butyl.

8. A compound according to claim 1 in which $R_3$ is n-butyl and $R_5$ is tert-butyl.

9. A compound according to claim 1 in which $R_3$ is tert-butyl and $R_5$ is tert-butyl.

10. A compound according to claim 1 in which $R_3$ is methyl and $R_5$ is 1-methylbutyl.

11. A compound according to claim 1 in which $R_3$ is ethyl and $R_5$ is 1-methylbutyl.

12. A compound according to claim 1 in which $R_3$ is n-propyl and $R_5$ is 1-methylbutyl.

13. A compound according to claim 1 in which $R_3$ is isopropyl and $R_5$ is 1-methylbutyl.

14. A compound according to claim 1 in which $R_3$ is methyl and $R_5$ is 1,1-dimethylbutyl.

15. A compound according to claim 1 in which $R_3$ is ethyl and $R_5$ is 1,1-dimethylbutyl.

16. A compound according to claim 1 in which $R_3$ is n-propyl and $R_5$ is 1,1-dimethylbutyl.

17. A compound according to claim 1 in which $R_3$ is isopropyl and $R_5$ is 1,1-dimethylbutyl.

18. A compound according to claim 1 in which $R_3$ is methyl and $R_5$ is 1-ethylpropyl.

19. A compound according to claim 1 in which $R_3$ is methyl and $R_5$ is sec-butyl.

20. A compound according to claim 1 in which $R_3$ is isopropyl and $R_5$ is sec-butyl.

21. A compound according to claim 1 in which $R_3$ is ethyl and $R_5$ is neopentyl.

22. A compound according to claim 1 in which $R_3$ is n-butyl and $R_5$ is isobutyl.

23. A compound according to claim 1 in which $R_3$ is n-butyl and $R_5$ is neopentyl.

24. A compound according to claim 1 in which $R_3$ is methyl and $R_5$ is neopentyl.

25. A compound according to claim 1 in which $R_3$ is methyl and $R_5$ is tert-butyl.

References Cited

Blazek, Chem. Abstracts, vol. 45, col. 569–570 (1951).

Ganapati, Chem. Abstracts, vol. 33, col. 2495 (1939).

Thoms et al., Chem. Abstracts, vol. 14, pp. 3638–39 (1920).

Doub et al., J. Am. Chem. Soc., vol. 80, pp. 2205–17 (1958).

Hansch et al., Biochemica et Biophysica Acta, vol. 112 (1966), pp. 381–391.

Johnston et al., J. Med. Chem., vol. 6, 669–679 (1963).

LEON ZITVER, Primary Examiner

M. W. GLYNN, Assistant Examiner

U.S. Cl. X.R.

260—552 R, 553 C, 347.2, 347.7, 470, 471 A, 453 R; 71—120, 88, 99, 111